US009692248B2

(12) United States Patent
Paladeni et al.

(10) Patent No.: US 9,692,248 B2
(45) Date of Patent: Jun. 27, 2017

(54) POSITIONING AID FOR WIRELESS ENERGY TRANSFER

(71) Applicant: Research In Motion Limited, Waterloo (CA)

(72) Inventors: Joshua David Paladeni, Plantation, FL (US); Joseph Patino, Miramar, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 714 days.

(21) Appl. No.: 13/828,799

(22) Filed: Mar. 14, 2013

(65) Prior Publication Data

US 2014/0266021 A1 Sep. 18, 2014

(51) Int. Cl.
*H01F 27/42* (2006.01)
*H01F 37/00* (2006.01)
(Continued)

(52) U.S. Cl.
CPC .............. *H02J 7/025* (2013.01); *H02J 5/005* (2013.01); *H02M 7/06* (2013.01)

(58) Field of Classification Search
CPC .. H02M 7/06; H02J 7/025; H02J 5/005; H02J 17/00; H02J 7/04; H02J 7/0047;
(Continued)

(56) References Cited

U.S. PATENT DOCUMENTS 8,278,784 B2 * 10/2012 Cook ................... H01Q 1/2225
307/149
8,825,118 B2 * 9/2014 Kim ..................... H02J 7/0047
455/41.1
(Continued)

FOREIGN PATENT DOCUMENTS

EP 2079146 7/2009
WO 2008114268 9/2008

OTHER PUBLICATIONS

"Wireless Receiver-Side Communication and Power Monitoring IC for Wireless Power," Texas Instruments, MSP430BQ1010, SLAS696—Dec. 2010, www.ti.com, Copyright 2010, Texas Instruments Incorporated.
(Continued)

*Primary Examiner* — Rexford Barnie
*Assistant Examiner* — Jagdeep Dhillon
(74) *Attorney, Agent, or Firm* — Jeffrey N. Giunta; Fleit Gibbons Gutman Bongini & Bianco P.L.

(57) ABSTRACT

A wirelessly powered device and operating method to aid in locating the device in relation to an energy transmitter. A device positioning aid processor places at least one component into a high electrical current consumption mode and determines, based on placing the at least one component into a high electrical current consumption mode, an amount of electrical current induced in a receiving coil that is adapted to inductively couple to a transmission coil external to the wirelessly powered device. An indicator, which is communicatively coupled to the device positioning aid processor, is configured to provide, in response to a determination of the amount of electrical current, an indication corresponding to the amount of electrical current.

20 Claims, 6 Drawing Sheets

(51) Int. Cl.
*H01F 38/00* (2006.01)
*H02J 7/02* (2016.01)
*H02M 7/06* (2006.01)
*H02J 5/00* (2016.01)

(58) Field of Classification Search
CPC ........ H02J 2007/005; H02J 2007/0096; H05B 37/02; B60L 11/182; H01F 38/14; H04M 2250/16; H04M 1/7253
USPC ....... 307/104, 149, 9.1, 43, 39, 66; 363/126, 363/127; 320/107, 162; 315/159, 152
See application file for complete search history.

(56) References Cited

U.S. PATENT DOCUMENTS

| | | | |
|---|---|---|---|
| 2007/0063674 A1* | 3/2007 | Voorwinden | H02J 7/0068 320/128 |
| 2011/0273138 A1 | 11/2011 | Baarman et al. | |
| 2011/0279079 A1* | 11/2011 | Do Valle | H02J 7/04 320/107 |
| 2011/0298420 A1 | 12/2011 | Forsberg et al. | |
| 2012/0019201 A1 | 1/2012 | Peterson | |
| 2012/0032522 A1* | 2/2012 | Schatz | A61N 1/3975 307/104 |
| 2012/0063186 A1* | 3/2012 | Tsui | H02M 5/2576 363/126 |
| 2012/0139355 A1* | 6/2012 | Ganem | H02J 5/005 307/104 |
| 2012/0153733 A1 | 6/2012 | Schatz et al. | |
| 2012/0184338 A1 | 7/2012 | Kesler et al. | |
| 2012/0206050 A1* | 8/2012 | Spero | B60Q 1/04 315/152 |
| 2012/0235636 A1* | 9/2012 | Partovi | H02J 7/025 320/108 |
| 2014/0084856 A1* | 3/2014 | Howard | H02J 7/007 320/108 |
| 2014/0229033 A1* | 8/2014 | Cook | G05B 19/00 701/2 |

OTHER PUBLICATIONS

EESR dated Jul. 29, 2013 for European Application No. 13159195.0.

* cited by examiner

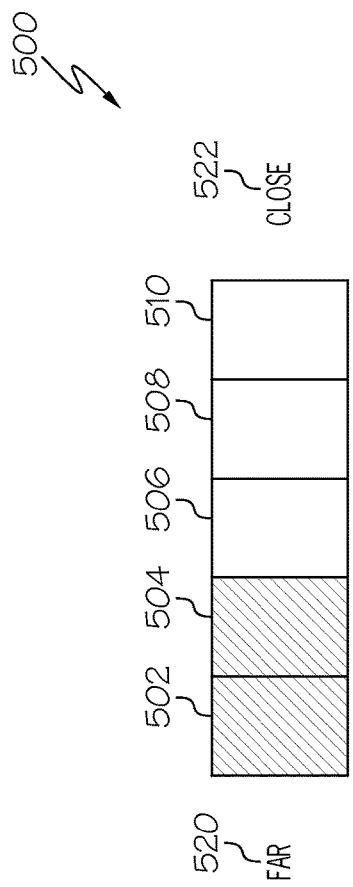
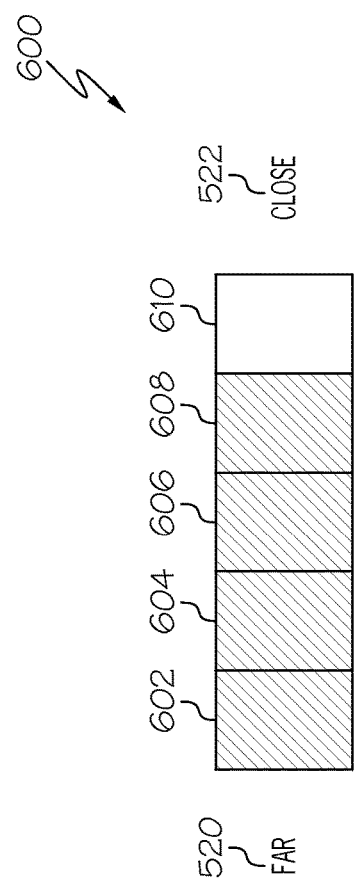

US 9,692,248 B2

POSITIONING AID FOR WIRELESS ENERGY TRANSFER

FIELD OF THE DISCLOSURE

The present disclosure generally relates to systems and method for wirelessly transfer energy between devices, and more particularly to aids for positioning of devices to wireless transfer energy fields there-between.

BACKGROUND

Wirelessly transferring energy between devices is one method used to transfer energy from an energy source to an energy consumer. For example, electronic devices with rechargeable power packs are able to support wireless recharging of some or all of the energy storage systems of those devices by wirelessly transferring energy to the device being recharged. In an example, an electronic device includes an energy receiving component, such as a receiving coil, to wirelessly receive magnetic energy that is emitted from a charging station. Energy received through the energy receiving component is then used to charge an energy storage device, such as a rechargeable battery. In one example, an electronic device is able to include an energy receiving coil that receives energy by inductively coupling to an energy transmission coil located in, for example, a charging station. The charging station passes electrical current through the transmission coil, usually as an alternating current (AC), to generate a time varying magnetic field. The receiving coil of the electronic device is able to be inductively coupled to the transmission coil of the charging station through the generated magnetic field and thereby receive energy conveyed through that magnetic field. When inductive coupling occurs, an electric current appears in the receiving coil. The strength or efficiency or robustness of the inductive coupling between the transmission coil and the receiving coil depends upon several factors, including the physical position relationship between the transmission coil and the receiving coil. In general, a user is able to move one or both of the electronic device and charging station in an effort to improve inductive coupling between the transmission coil and the receiving coil. As the distance between the transmission coil and the receiving coil increases or the coils become less aligned, the transmission of energy from the charging station to the electronic device becomes less efficient and generally decreases.

Techniques to provide an aid to a user for positioning of an electronic device relative to a wireless energy transmission station to provide improved coupling can benefit the effectiveness of wireless energy transfer operations.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 5 illustrates a weak magnetic coupling status indication, according to one example;

FIG. 6 illustrates a strong magnetic coupling status indication, according to one example.

DETAILED DESCRIPTION

Figure 1:
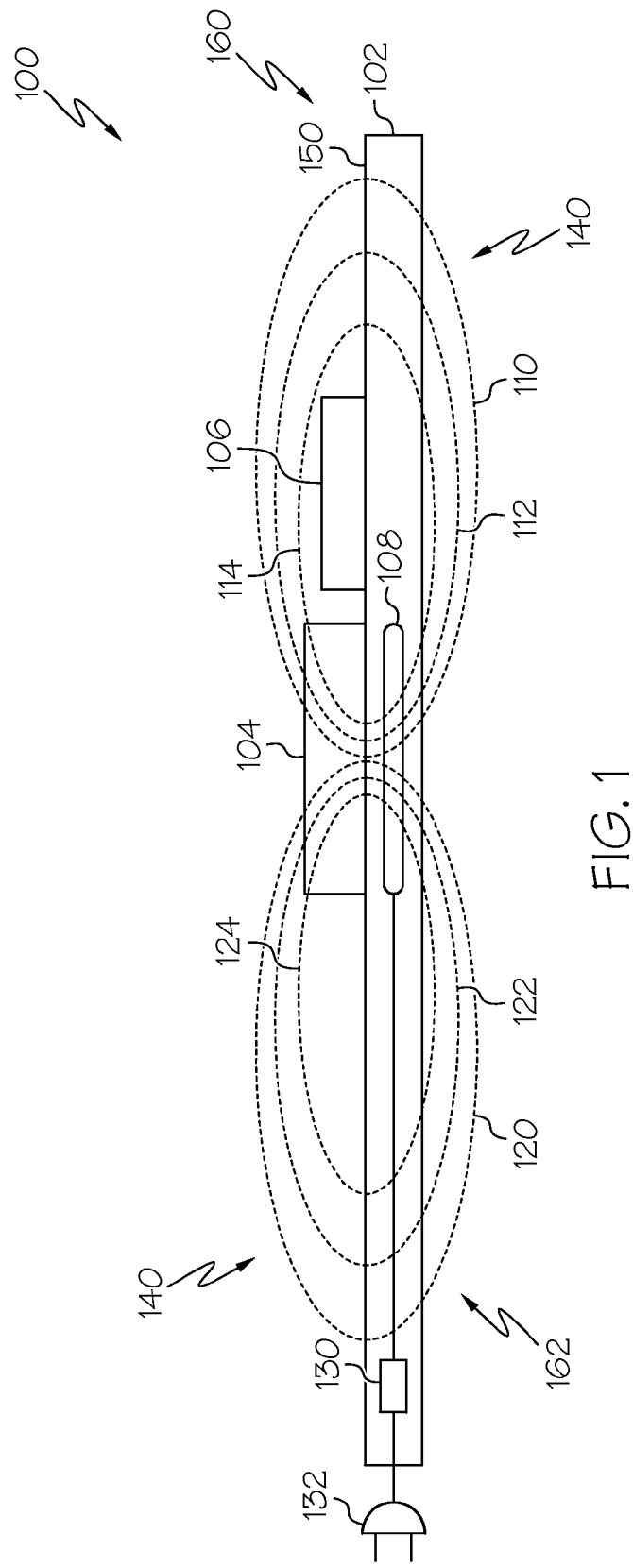
FIG. 1 illustrates a wireless charging arrangement, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). According to context, the term "coupled," as used herein, is generally defined as "connected," although not necessarily directly, and not necessarily mechanically. In the case of inductive coupling, there may be no physical connection between components, as inductive coupling between two coils can occur when a current in one induces a current in the other even if the coils are separated. Components that are "communicatively coupled" are configured to communicate (that is, they are capable of communicating) in any fashion for any duration, such as by way of electric signals, optical signals, wireless signals, or any combination thereof. Communicatively coupled components are able to be directly connected to one another, connected through any combination of intermediate physical components or other elements that support communications between the communicatively coupled components, connected at least in part by one or more electromagnetic, optical or similar communications medium, by one or more other coupling components, or by combinations of these. The terms "configured to" and "adapted to" describe hardware, software or a combination of hardware and software that is (according to context) capable of, set up, arranged, built, composed, constructed, designed, able to accommodate or make, suitable to carry out or that has any combination of these characteristics to carry out a given function. In the following discussion, "handheld" is used to describe items, such as "handheld devices," that are sized, designed and otherwise configured to be carried and operated while being held in a human hand.

The below described systems and methods provide cost effective and efficient methods and apparatuses to provide an aid in positioning wirelessly powered electronic devices relative to a wireless energy transmitter, such as a wireless charging station, in order to provide better coupling of energy being transferred to the electronic device. Any device that can receive power wirelessly (typically consuming the power right away, storing it for later use, or both) may be called a "wirelessly powered device." Examples of wirelessly powered electronic devices may include, for example, a data messaging device, a two-way pager, a cellular telephone or mobile phone or smart phone, a digital audio/video player, a digital audio/video recorder, a navigation device (such as a global positioning system navigator), a remote control, or a tablet computer. Some rechargeable power packs, such as rechargeable batteries having an energy receiving coil or that can be wirelessly charged separate from another electronic device, may also be deemed to be wirelessly powered devices. The wirelessly transferred energy is able to power various circuits of the electronic device, such as charging one or more power packs of an electronic device.

The below described examples provide an indication of the strength of magnetic coupling between an energy transmitter and an energy receiver that is based on the magnitude of electrical current generated in a receiving coil of the electronic device receiving the transferred energy. In order to cause a sufficient electrical current drain through the receiving coil when the strength of the magnetic coupling is high, one example places the electronic device, such as by placing at least one component within or otherwise powered by the electronic device, into a high electrical current consumption mode. Generally speaking, placing an electronic device into a high electrical current consumption mode entails causing components within the electronic device to draw enough current such that, to a reasonable degree of certainty or reliability, the strength of magnetic coupling can be (or ought to be expected to be) measured or otherwise assessed over a large range of magnetic coupling. In general, an electronic device in a high electrical current consumption mode draws at least as much electrical current as a receiving coil is designed to produce when the receiving coil is exposed to a relatively high level of magnetic field intensity, such as is provided by a charging station in close proximity. The amount of high current need not be subject to precise numerical measurement and may vary from device to device or from coil to coil. Colloquially speaking, a high current consumption mode may generally be regarded as a manner of operating in which the electrical current drawn by the electronic device via its receiving coil can serve as a good indicator or sign of the strength of the inductive coupling between the receiving coil and a transmission coil. By ensuring a significant electrical current draw through the receiving coil, variations or changes in the electrical current drawn through the receiving coil when the device is moved may be assessed or otherwise transformed into useful information about the strength of coupling. In other words, the electrical current (if it is high enough) may reliably vary with the strength of the magnetic coupling to the transmission coil and may indicate the robustness of the coupling. When an electronic device is not placed into or otherwise determined to not be in an electronic device into a high electrical current consumption mode, then the electronic device may be deemed to be in a low electrical current consumption mode.

Although the below description uses an example of a wireless charging arrangement for an electronic device, it is clear that the concepts described by way of the below detailed examples are applicable to any configuration used to wirelessly transfer energy from one place to another. Further examples of applications of the below described concepts include, without limitation, wirelessly coupling energy to an electric vehicle from a charging station, wirelessly providing energy to an electronic device with circuitry or other components that directly consume the energy being transferred without storing that energy in an energy storage device, any other application, or combinations of these.

FIG. 1 illustrates a wireless charging arrangement 100, according to an example. The illustrated wireless charging arrangement 100 includes a charging station 102 that includes a transmission coil 108. In some examples, the charging station 102 may be, for example, a stand-alone charging station, or may be included in another device, such as a docking station. The charging station 102 has a coil driving circuit 130 that receive electrical energy from, for example, a wall socket plug 132. The coil driving circuit 130 further drives the transmission coil 108 in one example with an alternating current to transmit energy in the form of a time varying magnetic field 140. As is understood by practitioners of ordinary skill in the relevant arts, an electrical coil, such as the transmission coil 108, that is driven with an electrical current generates a toroidal magnetic field. The magnetic field generated by the transmission coil 108 has its highest density near the middle of the transmission coil 108. The density of the magnetic field generated by the transmission coil 108 decreases with distance in any direction from the middle of the transmission coil 108. In various examples, a magnetic field similar to the magnetic field 140 described herein is able to be generated by any transmission coil or other structure. Such a transmission coil or other structure is able to be associated with any suitable device or apparatus.

The wireless charging arrangement 100 depicts a number of magnetic flux lines that represent the density of the magnetic field 140 generated by the transmission coil 108. The magnetic field 140 on one side of the charging station 102 is depicted by a first flux line 110, a second flux line 112 and a third flux line 114. The magnetic field 140 on the other side of the charging station 102 is depicted by a fourth flux line 120, a fifth flux line 122 and a sixth flux line 124. The illustrated distance between the first flux line 110, the second flux line 112 and the third flux line 114 is least in the center of the transmission coil 108 and greatest at the first edge 160 and the second edge 162 of the magnetic fields that are furthest from the center of the transmission coil 108.

A charging station surface 150 is a surface or other suitable area of the charging station 102 on which an electronic device is able to be placed to receive wirelessly coupled energy from the charging station 102. The charging station surface 150 is able to be, but is not required to be, larger than an electronic device that is placed on the charging station surface 150. In one example, the charging station surface 150 does not include physical features, such as printed marks, protrusion, other aids, or similar elements, to aid in positioning an electronic device on the charging station surface 150. In one example that is described in detail below, the electronic device being placed on the charging station surface 150 produces a positioning aid to facilitate a user's placing the electronic device at a location of the charging station surface that has a higher level of magnetic energy. In further examples, markings or other features to aid in positioning the electronic device on the charging station are able to be located on the charging station surface 150, or on other components associated with the charging station 102. In an example of a charging station 102 that has physical markings or other features, manufacturing tolerances or other factors may allow for an improvement in coupling between the transmission coil 108 and the electronic device by further moving the electronic device while monitoring the actual magnetic field coupling as is described below.

The wireless charging arrangement 100 shows an electronic device as it is moved between two locations. The wireless charging arrangement 100 depicts the electronic device in a close position 104 and further depicts the same electronic device as it is moved further from the transmission coil 108 as an electronic device in a distant location 106. The electronic device in both of these positions receives energy that is wirelessly transferred from the charging station 102. The electronic device in a close position 104 is located above the transmission coil 108 and is on or near the charging station surface 150. The electronic device in a close position 104 is in a location with a high concentration of magnetic flux lines. The depicted electronic device in a distant position 106 is located away from the center of the transmission coil 108 but also on or near the charging station surface 150. The electronic device in a distant position 106 is shown to be in a location with a lower density of magnetic flux lines relative to the location of the electronic device in a close position 104. Based upon differences in the strength of the magnetic field at these two locations, a higher level of magnetic energy is available to the electronic device in a close position 104 than to the electronic device in a distant position 106. In further examples, devices to be charged are also able to be located above the charging station surface 150 or in any location relative to the charging station surface 150 and the transmission coil 108.

The coil driving circuit 130 receives electrical power from an external source, such as through a wall plug 132 in this example. Further examples are able to receive energy from any source to produce an electrical current in the transmission coil 108 of the charging station 102. The coil driving circuit 130 in one example is able to drive the transmission coil 108 with an alternating electrical current (AC) with a fixed magnitude. In a further example, a data communications link is able to be established between the coil driving circuit 130 and an electronic device being charged, such as one or both of the electronic device in a close position 104 and the electronic device in a distant position 106, to communicate electrical current requirements of the electronic device receiving the transferred energy. A coil driver circuit 130 that receives an indication of the electrical current requirements of the electronic device is able to vary, in response to the received indication of electrical current requirements, the electrical current driving the transmission coil 108 and thus the amount of magnetic energy available at the receiving electronic device.

In an example where the electronic device in a close position 104 and the electronic device in a distant position 106 have similar receiving coils to receive magnetic energy from a time varying magnetic field in their respective environments, the higher magnetic field intensity at the electronic device in a close position 104 causes its receiving coil to produce more electrical energy than the receiving coil of the electronic device in a distant position 106. A similar difference in electrical energy production is observed when the same electronic device is moved from the position of the electronic device in a distant position 106 to the position of the electronic device in a close position 104. In an example described below, electronic devices provide a user with an indication of the relative coupling strength between the receiving coil of an electronic device and the transmission coil 108 as the electronic device is moved in relation to the transmission coil 108

The transmission coil 108 in some examples are driven with a relatively high level of electrical current to generate the magnetic fields used to generate the electrical current in the electronic device receiving the transmitted energy in order to transfer a sufficient amount of energy to the electronic device. The transmission coil 108 in a charging station generates heat under some conditions due to the amount of electrical current flowing through the coil. The heat generated by the transmission coil 108 is able to be conducted to the charging station surface 150. The heat conducted to the charging station surface 150 is then able to be conducted to any devices in contact with the charging station surface 150, such as devices that are placed on the charging station surface 150 in order to wirelessly receive energy.

Placing an energy receiving device in a location that has weak coupling between the transmission coil 108 and the receiving coil of the receiving device causes the receiving coil to receive less of the energy transmitted by the transmission coil 108. In one example, the energy generated by the transmission coil that is not coupled to a receiving coil and used by a receiving device is dissipated as heat in the transmission coil 108. When there is weak coupling between the transmission coil 108 and a receiving coil, a larger amount of heat is generated in the transmission coil 108 because less energy is transferred to and used by the receiving device. The larger amount of heat generated in the transmission coil 108 causes more heat to be conducted to the charging station surface 150. This heat is then able to be conducted on to the receiving device that is resting on the charging station surface 150 and raise the temperature of the receiving device and its components, such as its power pack. Also, the reduced electrical current being generated by a receiving coil of a receiving device that is located at a distance from the transmission coil 108 causes the device to take longer to recharge its power pack and thereby results in more time for heat to be conducted to the device being recharged. As a result, an electronic device placed at a location of the charging station surface 150 that does not provide strong coupling between the transmission coil 108 and the receiving coil of the electronic device is able to cause the electronic device to be heated for a substantial time, which may degrade the performance of components of the electronic device. In one example, the charging time will increase due to the decreased charging current and may further increase due to an increased temperature of the power pack of the electronic device caused by the extra heat that is transferred to receiving device. The proper placement or positioning of the electronic device wirelessly receiving energy in a location that is closest to the transmission coil 108 improves energy transfer efficiency, decreases power pack recharging times, and in some examples allows the electrical current in the transmission coil 108 to be more quickly reduced or discontinued because the power pack of the device more rapidly reaches a full charge.

Figure 2:
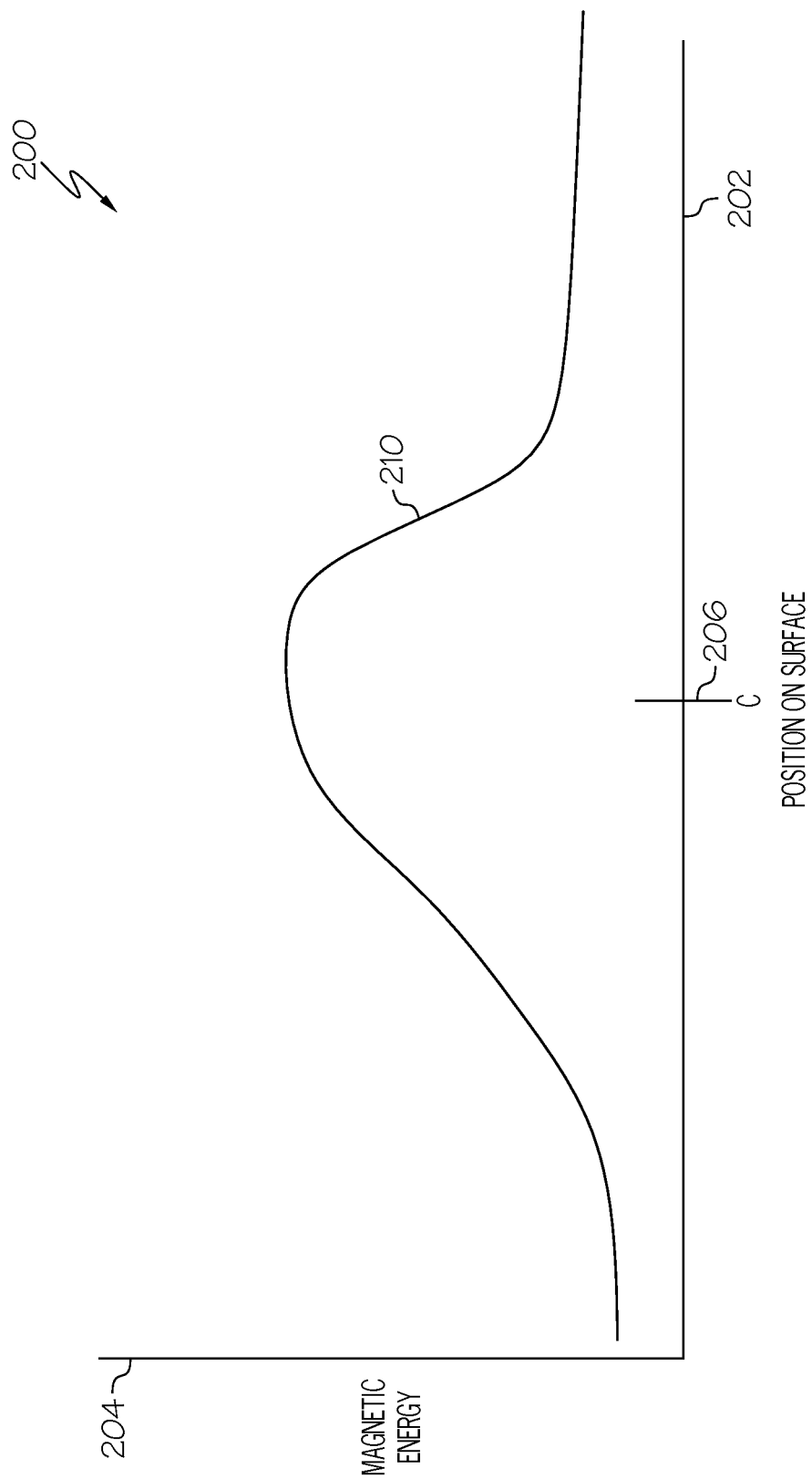
FIG. 2 illustrates a magnetic energy versus position graph, according to an example.

FIG. 2 illustrates a magnetic energy versus position graph 200, according to an example. The magnetic field intensity versus position graph 200 depicts an example relationship between the magnetic energy available to an electronic device as a function of distance of that device from the transmission coil generating the magnetic field. With reference to the above example described with regards to FIG. 1, the magnetic energy versus position graph 200 illustrates the magnitude of a magnetic field available to an electronic device on the charging station surface 150 as a function of the position of that electronic device on the surface of the charging station.

The magnetic field intensity versus position graph 200 depicts a horizontal axis 202 indicting the position of a device relative to the center of a transmission coil such as the above described transmission coil 108, and a vertical axis 204 indicating the magnetic field intensity at different distances from the transmission coil. The horizontal axis 202 includes a "center," or "C," mark 206 that corresponds to the closest point at which an electronic device is able to be placed near the transmission coil. In the example of FIG. 1, the transmission coil 108 of the charging station 102 generates a magnetic field with intensities at different locations of the surface of the charging station surface 150 depicted by the magnetic field intensity versus position graph 200. In that example, the "C" mark 206 corresponds to a location on the charging station surface 150 that is above the transmission coil 108 and is therefore closest to the center of the transmission coil 108. In the context of placing an electronic device on the charging station surface 150, the horizontal axis 202 is able to reflect the position of an electronic device along any line that is drawn on the charging station surface 150 and that includes or passes near the point of the charging station surface 150 that is closest to the center of the center of the charging coil 108, i.e., the point that corresponds to the "C" mark 206.

The magnetic field intensity curve 210 has a peak at the "C" mark 206, which is the closest point to the transmission coil generating the magnetic field. The magnetic field intensity curve 210 is further shown to monotonically decrease as the position moves away from the "C" mark 206. As is understood by practitioners of ordinary skill in the relevant arts, locating a receiving coil of a device at locations corresponding to points on the horizontal axis 202 cause the receiving coil to produce an electrical current at a level commensurate with the strength of the magnetic field indicated by the vertical axis 204 where the point on the horizontal axis 202 intersects the magnetic field intensity curve 210. This relationship is utilized by the below described example to indicate charging efficiency of a device at its present location.

Figure 3:
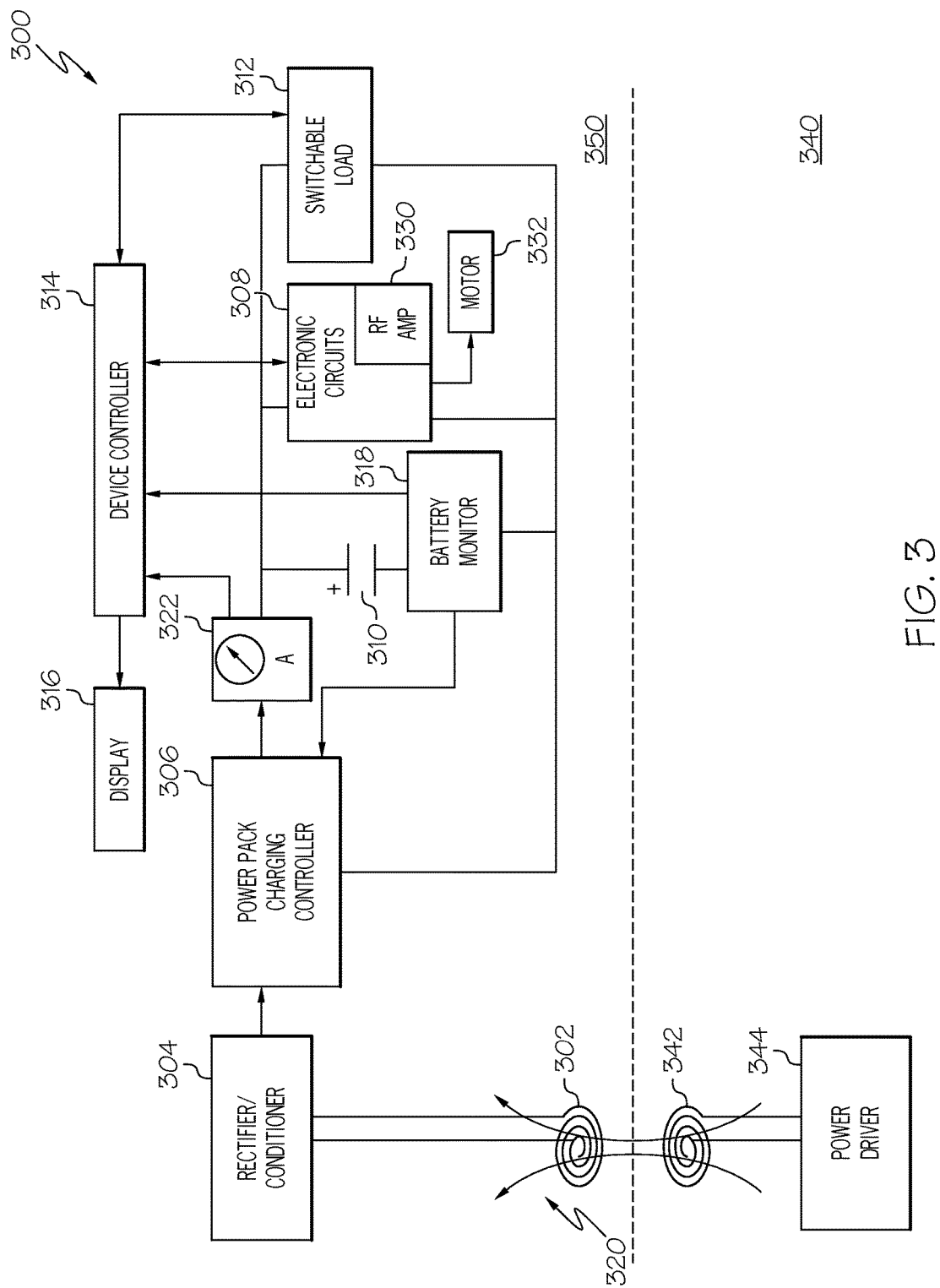
FIG. 3 illustrates an electronic device and charger configuration, according to one example.

FIG. 3 illustrates an electronic device and charger configuration 300, according to one example. The electronic device and charger configuration 300 depicts components of an electronic device 350 and a charging station 340 that are relevant to the subject matter described below. The charging station 340 includes a power driver 344 that drives a transmission coil 342 to generate a time varying magnetic field 320 to wirelessly transfer energy to the electronic device 350. The electronic device 350 of this example includes components to support wirelessly receiving the energy to generate electrical currents. The generated electrical currents are able to be used, for example, to charge power packs, such as rechargeable batteries, provide power to circuits of the electronic device 350, for other purposes, or combinations of these.

The electronic device 350 includes electrical circuits 308 that perform processing or other operations in support of the operation of the electronic device 350. Electrical circuits 308 in various examples are able to perform any operation. In some examples, the electrical circuits 308 are able to be configured in different modes or manners of operating, with one or more modes causing the electrical circuits 308 to draw more electrical current. In some cases, the electrical circuits 308 can increase or decrease or otherwise control the amount of current drawn, such as by activating or deactivating components or having the components draw more or less electrical current when they are activated. In one example, the at least one component of the electronic device 350 is able to be placed into a high electrical current consumption mode by activating one or more components connected to or that are part of the electrical circuits 308. A wireless communications device, for example, is able to have electrical circuits 308 that include high electrical current consumption components such as Radio Frequency (RF) Amplifier (RF Amp) 330, a device vibration motor 332, a display backlight that is part of display 316, other components, or combinations of these. Further electronic devices are able to include various other components that draw significant electrical current when they are activated. Activating, for example, the Radio Frequency Amplifier (RF Amp) 330, the device vibration motor 332 or any other motor, the display backlight, other components, or combinations of these is an example of placing at least one component of the electronic device 350 into a high electrical current consumption mode.

The electronic device 350 further includes a device controller 314. Device controller 314 performs various control functions for the electronic device 350, such as controlling the mode of the electrical circuits 308, exchanging data with the electrical circuits 308, changing or modifying charging of a power pack 310 as is described in detail below, perform other operations, and combinations of these. In one example, the device controller 314 operates as a device positioning aid processor that is configured to perform a process to aid in positioning a device, such as the electronic device 350, that is inductively coupling to a charging station 340. The device controller 314 further exchanges information with various components of the electronic device 350 to monitor the status of components within the electronic device 350, to support control of operational aspects of the electronic device 350, to perform other functions, or combinations of these. The device controller 314 in some examples is also able to change or modify an operating mode of the electrical circuits 308 that causes the electrical circuits 308 to draw more electrical current. Examples of mode changes or modifications that cause an increase in electrical current include, for example, activating the RF Amp 330, activating the motor 332, activating a display backlight or other illumination of the display 316, activating or modifying other modes, or combinations of these.

The depicted electronic device 350 includes a receiving coil 302 that is shown as being within the magnetic field 320 generated by the charging station 340. In the illustrated example, the magnetic field 320 is a time varying magnetic field that operates to generate an alternating electrical current within the receiving coil 302. The time varying magnetic field 320 is able to be generated by any device, such as by the transmission coil 342 within the wireless charging station 340. A similar magnetic field is able to be generated by any suitable technique to wirelessly transfer energy to the electronic device 350. As is understood by practitioners of ordinary skill in the relevant arts, exposing the receiving coil 302 to a time varying magnetic field causes an electrical current to flow through the receiving coil 302 with a magnitude that is proportional to the strength of the magnetic field at the receiving coil 302. As discussed below, the strength of the magnetic field at the receiving coil 302 varies based on the coupling between the transmission coil 342 and the receiving coil 302, which is affected by, for example, the distance between and the orientation of the transmission coil 342 and receiving coil 302 relative to each other.

The receiving coil 302 is electrically connected to a rectifier/conditioner 304. The rectifier/conditioner receives alternating electrical current produced by the receiving coil 302 and conditions the electrical current for use by other components of the electronic device 350. In one example the rectifier/conditioner 304 rectifies and filters the received alternating electrical current produced by the receiving coil 302 in order to produce a Direct Current (DC) power signal more suitable to drive other electrical components, such as power supplies or power pack charging controllers.

The illustrated rectifier/conditioner 304 provides a rectified and conditioned DC power signal to a power pack charging controller 306. The power pack charging controller 306 operates to control charging of a power pack 310 of the electronic device 350. The power pack 310 in one example is able to be a rechargeable battery. In further examples, the power pack 310 is able to be any rechargeable power source suitable to provide any type of power to the components of the electronic device 350.

In one example, the power pack charging controller 306 charges the power pack 310 by applying different voltages or electrical current levels to the power pack 310 based upon the state of charge of the power pack 310. In one example, the power pack charging controller 306 uses a "constant current" charging mode that configures the power pack charging controller 306 to provide a defined electrical current to the power pack 310. In various examples, the power pack charging controller 306 applies a constant (or nearly constant) electrical current to charging of the power pack 310 while the power pack 310 has a charging state that is between discharged and almost fully charged. Once the power pack reaches a defined level that is generally within a specified range that is close to fully charged, the power pack charging controller 306 of one example transitions to a "constant voltage" charging mode wherein the power pack charging controller 306 provides a defined electrical voltage across the power pack 310. In various examples, the power pack charging controller 306 applies a constant (or nearly constant) voltage to the power pack 310 to maintain the charge level of the power pack 310. In various examples, the power pack charging controller 306 is able to operate in a constant current charging mode by providing an electrical current with a varying value. The power pack charging controller 306 is also, or alternatively, able to operate in a constant voltage charging mode by providing an electrical voltage across the power pack 310 with a value that varies.

The power pack charging controller 306 in one example provides information to the device controller 314 that indicates one or more status conditions or values associated charging operations of the power pack charging controller 306. In one example, the power pack charging controller 306 provides an indication or signal of an availability of electrical power being received from the rectifier/conditioner 304, which is an indication of magnetic energy being received by the receiving coil 302. The device controller 314 is able to interpret the indication of received magnetic energy as an indication that wireless charging or electrical energy transfer to the electronic device 350 is able to occur.

A battery monitor 318 in one example monitors various electrical conditions, such as the state of charge, of the power pack 310. The battery monitor 318 maintains an estimate the state of charge of the power pack 310 and provides an indication of the present state of charge of the power pack 310 to the power pack charging controller 306 and to the device controller 314. The battery monitor 318 in one example is a battery "fuel gauge" circuit that is incorporated into the electronic device 350 or is also able to be incorporated into the power pack 310. In one example, the battery monitor 318 measures the electrical current that flows through the power pack 310 and maintains an integral or summation of the electrical current flowing through the power pack 310 and determines an estimate of the present state of charge of the power pack 310 based on that integral or summation. In one example, the battery monitor 318 is referred to as a "coulomb counting" monitor because the circuit integrates, or maintains a count of, the amount of electrical charge flowing into and out of the power pack 310. Determining an amount of electrical current may include, but need not include, making a numerical measurement or estimation (such as estimating a number of amps flowing in a conductor). Determining an amount of current may also entail (for example) comparing an amount to one or more benchmarks or thresholds, or identifying the current as being in a range of current magnitudes, or calculating whether the current is sufficient to perform a function, or measuring an effect of the current instead of measuring the current itself.

The electronic device 350 includes a switchable load 312 that is configured to draw electrical current produced by the power pack charging controller 306. In one example, the switchable load 312 is connected in a parallel configuration with the power pack 310. Components may be in a parallel configuration if they are strictly in parallel or if they behave substantially as if they were strictly in parallel. In some cases where two or more components are in parallel, if one of the components ceases to draw electrical current or otherwise becomes nonconductive, all or nearly all of the current continues to flow through the other parallel components. The switchable load 312 in one example is able to be switched between an electrically "open" state and an electrically conductive state. In the electrically open state, little or no electrical current flows through the switchable load 312. In the electrically conductive state, the switchable load 312 has an electrical impedance value that causes an amount of electrical current to flow through the switchable load 312. When in the electrically conductive state, the switchable load will draw an amount of electrical current from the power pack charging controller 306, and thereby cause an increase in the electrical current that is able to be drawn through the receiving coil 302.

As an alternative to, or in addition to, the switchable load 312, some examples are able to incorporate electrical circuits 308 that are able to be configured to draw larger amounts of electrical current. In one example, the electrical circuits 308 are able to include a digital processor with variable processing speed that is controlled by a processing clock speed of the processor. In such an example, the electrical circuits 308 are able to be configured to draw higher amounts of electrical current, and thereby have at least one component placed into a high electrical current consumption mode, by increasing the processing clock speed of the digital processor. In one example, increasing the processing clock speed includes configuring the processing clock speed of the digital processor to operate at the maximum processing clock speed of the digital processor. In a further example, the electrical circuits 308 are able to include a display with a variable intensity display backlight and the electrical circuits 308 are able to be configured to draw higher amounts of electrical current, and thereby have at least one component placed into a high electrical current consumption mode, by increasing the intensity level of light emitted by the variable intensity display backlight. In one example, increasing the intensity level of light emitted by the variable intensity display backlight includes increasing the intensity level of light emitted by the variable intensity display backlight to a full intensity level.

The electronic device 350 of one example includes an electrical current meter 322 that monitors the electrical current being output by the power pack charging controller 306. In various examples, the electrical current meter 322 is able to be incorporated into the power pack charging controller 306, incorporated into the power pack 310, be a separate component of the electronic device, or combinations of these. The electrical current meter 322 in one example provides to the device controller 314 an indication of the electrical current being produced by the power pack charging controller 306. This indication of electrical current being produced by the power pack charging controller 306, as determined and reported by the electrical current meter 322, reflect the amount of electrical current available to the power pack charging controller 306 and therefore indicates the strength of the magnetic field coupling to the receiving coil 302. In further examples, a similar electrical current meter is able to be provided at any suitable circuit location, such as between the rectifier/conditioner 304 and the power pack charging controller 306, between the receiving coil 302 and the rectifier/conditioner 304, or in any other circuit location. In one example where the power pack 310 is sufficiently discharged, the electrical current charging the power pack 310 is able to be measured by the battery monitor 318 and reported to the device controller 314 as a basis for indicating the amount of electrical current flowing through the receiving coil 302.

The device controller 314 is able to determine when an insufficient amount of electrical current is being drawn from the power pack charging controller 306, such as may occur when the power pack charging controller 306 is charging the power pack in a constant voltage mode. When a power pack is being charged in a constant voltage mode, the power pack is generally close to a full charge and a significant amount of electrical current may not be drawn through the receiving coil 302 when the power pack 310 is being charged in a constant voltage charging mode. In order to increase the electrical current drawn through the power pack charging controller 306, and ultimately through the receiving coil 302, the device controller 314 is able to configure the electronic circuits 308 into a mode that has higher electrical current consumption. In another example, the switchable load 312 is able to be additionally or alternatively put into an electrically conductive state to cause more electrical current to be drawn through the power pack charging controller 306, and thus through the receiving coil 302.

The device controller 314 of one example performs processing that assists a user of the electronic device 350 in positioning one or both of the electronic device 350 or wireless charging station 340 to improve or try to increase the magnetic coupling between those two coils. The device controller 314 in one example determines the present level of electrical current being induced and, and therefore drawn through, the receiving coil 302 and, in response to the determination of that amount of electrical current, provides feedback to a user of the relative level of electrical current being drawn through the receiving coil 302. An increase in electrical current being drawn through the receiving coil 302 in this example is assumed to be caused by increased coupling between the transmission coil 342 and the receiving coil 302 and the accompanying increase in electrical current induced in the receiving coil due to the increased coupling. In order to ensure detection of a wide range of coupling between these two coils, the device controller 314 operates to ensure that the power pack charging controller 306 is driving a load that is consuming a high level of electrical current. For example, the device controller 314 is able to determine if the power pack charging controller 306 is charging the power pack 310 in a constant current mode. If the power pack 310 is not being charged in a constant current mode, the device controller 314 is able to, for example, configure the electronic circuits 308, the switchable load, 312, other components, or combinations of these, into respective modes that result in a high level of electrical current consumption by the electronic device 350, and that will correspondingly cause a high level of electrical current to be drawn through the receiving coil 302 when it is in a sufficiently strong magnetic field 320.

The device controller 314 operates to cause the electronic device 350 to produce one or more user outputs that correspond to the amount of electrical current induced in the receiving coil 302 that is adapted to inductively couple to a transmission coil. In one example, the user output is based upon a determination of the amount of electrical current measured by the electric current meter 322, which corresponds to the electrical current induced in the receiving coil 302, and that is reported to the device controller 314. In further examples, any suitable device is able to measure the electrical current induced in and that is thereby flowing through the receiving coil 302 and provide indications of such measurements to the device controller 314 in order to produce user outputs, such as indications that are provided by one or more indicators, that reflect the amount of electrical current induced in and thus flowing through the receiving coil 302. In various examples, electrical current induced in the receiving coil 302 is measured by an electrical current meter that is located between the receiving coil 302 and circuits consuming electrical current. In a further example, a "fuel gauge" circuit implementing the battery monitor 318 is able to measure an amount of electrical current that is dependent upon the electrical current drawn through the receiving coil 302 and report that measured electrical current to the device controller 314. Data reflecting the value of the measured electrical current is provided to the device controller 314 and used to provide an aid in positioning the device in an area of strong magnetic coupling to the transmission coil, as described below. In general, a processor such as a device positioning aid processor within the device controller 314, determines an amount of electrical current induced in the receiving coil 302, and in response to that determination of the electrical current, an indication corresponding to the amount of electrical current is provided by an indicator that is communicatively coupled to the device positioning aid processor.

The provided indications are user outputs in one example that include outputs that a human user is able to sense and that convey the relative level of electrical current being induced in and thereby drawn through the receiving coil 302. A user is then able to move one or both of the electronic device 350 and wireless charging station 340 to cause the user output provided by the electronic device 350 to indicate a higher level of electrical current being drawn through the receiving coil 302. Providing a user output, or providing a user with an indication, may be carried out in any fashion. The user outputs are able to include, for example, audible indicators, visual indicators (which may include display screens or other components that can display text, numbers, graphics, animations, flashing or colored lights and the like), vibration based indicators, other indicators, or combinations of these. An indicator may be any device or component or structure that can convey in any fashion information (or an indication) as a function of or corresponding to the amount of electrical current.

Various characteristics of the indicators provided by the electronic device 350 are able to be varied to indicate the relative level of electrical current drawn through the receiving coil 302. For example, volume, frequency, or both, of an audible indicator is able to be increased as the electrical current drawn through the receiving coil 302 increases. Visual indicators are provided in some examples by a display 316. Display 316 in various examples may include one or more lights that indicate the level of electrical current drawn through the coil 302 by, for example, varying a number of lights illuminated, varying the intensity of illuminated lights, or combinations of these. Display 316 in further examples is able to include an alphanumeric display, graphical display, or combinations of these that presents visual data indicating the level of electrical current being drawn through the receiving coil 302.

In further examples, the device controller 314 is able to produce indications in other forms that reflect the strength of magnetic coupling between the transmission coil 342 and the receiving coil 302. For example, the indication corresponding to the amount of electrical current induced in the receiving coil 302 is able to be provided in a suitable form to at least partially control the operation of an automatic, semi-automatic, or manual positioning system. The indication in one example is able to include an electrical or other data conveying signal that aids the positioning system in positioning the electronic device 350 into a position with strong magnetic coupling. Such a positioning system may include, for example, electromagnetic or other types of actuators that are electrically or otherwise controllable to position or otherwise move an electronic device containing a receiving coil 340.

Figure 4:
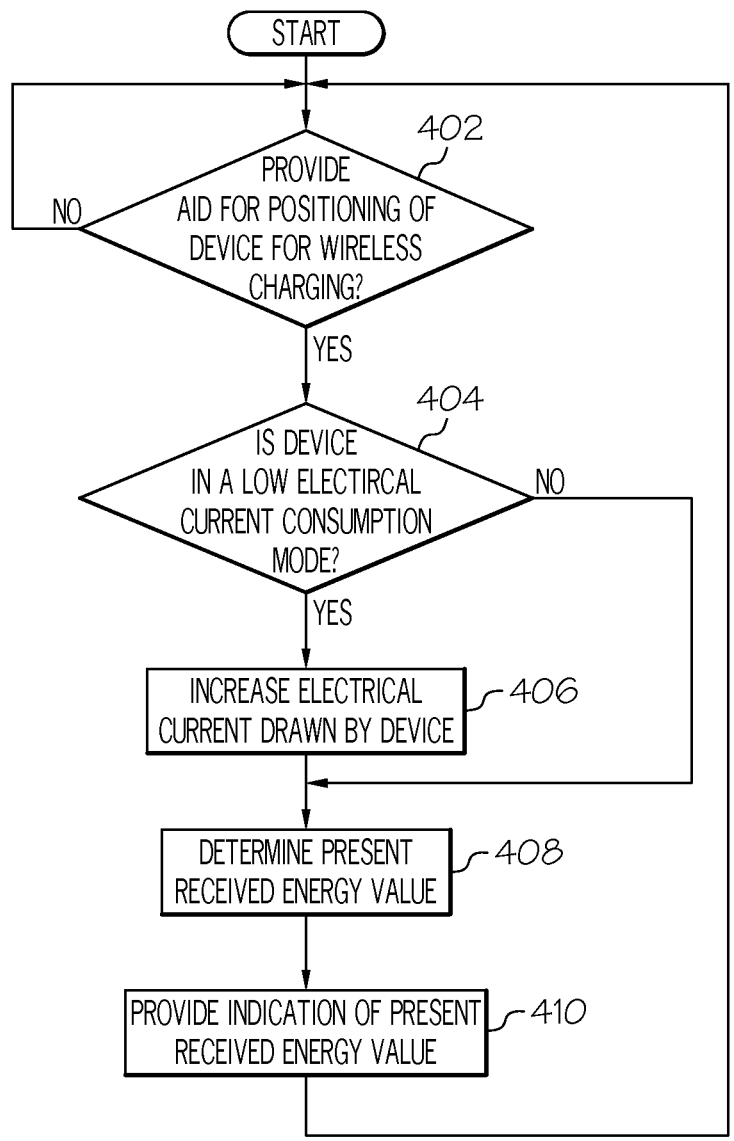
FIG. 4 illustrates a wireless energy transfer component positioning aid process, according to an example.

FIG. 4 illustrates a wireless energy transfer component positioning aid process 400, according to an example. The following description of the wireless energy transfer component positioning aid process 400 refers to the components described above with regards to FIG. 3 above. Further examples are able to implement the subject matter described below for the wireless energy transfer component positioning aid process 400 using any suitable components or structure. Referring to the example of FIG. 3, the wireless energy transfer component positioning aid process 400 is performed by the device controller 314 (which is one example of device positioning aid processor, that is, one or more processing elements that carry out or direct or control positioning aid process 400) and provides an aid to move the electronic device 350 into a position and orientation relative to the transmission coil 342 that results in a better level of magnetic field coupling between the transmission coil 342 and the receiving coil 302.

The wireless energy transfer component positioning aid process 400 begins by determining, at 402, if an aid for positioning of the device for wireless charging is to be provided. In one example, determining to provide such an aid is able to be in response to receiving one or more inputs, such as a user interface command received from a user of the device, a detection of electrical current being generated by the receiving coil 302 indicating the presence of wireless energy, inputs received by other sensors or facilities, or combinations of these. An observation that the power pack charging controller 306 is producing an electrical current output as indicated by, for example, the electrical charging current meter 322 is an example of detecting electrical current being generated by the receiving coil 302 and an aid for positioning of the electronic device is able to be provided based on that observation. In further examples, the power pack charging controller 306 is able to detect an electrical current produced by the receiving coil 302, or detect a voltage potential across being generated across the receiving coil 302, as an indication that a charging current is detected. This indication is then able to be provided to the device controller 314 in order to control the flow of the wireless energy transfer component positioning aid process 400. The determination of whether to provide an aid in positioning the device continues until the determination is true.

In some examples, a device performing the wireless energy transfer component positioning aid process 400 has a communications link through which the strength of the generated magnetic field is able to be controlled. Such a communications link is able to command the magnetic field generator to reduce the strength of the magnetic field when the electrical current consumption of the device is low. In such examples, commands to change the strength of a generated magnetic field are suspended in response to a determination to provide an aid for positioning of the device for wireless charging. In further examples, commands to change the magnitude of the generated magnetic field are incorporated into the below described processing to allow an evaluation of the magnitude of magnetic coupling.

Based on determining to provide an aid in positioning the device, the wireless energy transfer component positioning aid process 400 in one example determines, at 404, if the device performing the wireless energy transfer component positioning aid process 400 is itself operating in a low electrical current consumption mode. A low electrical current consumption mode in one example corresponds to the power pack charging controller 306 operating in a constant voltage charging mode (in which the electrical current induced in, and thereby drawn through, the receiving coil of the electronic device may or may not be a reliable sign of the strength of magnetic coupling). In one example, a determination that the device is operating in a low electrical current consumption mode includes determining that a power pack of the device is being charged in a constant voltage charging mode In further examples, a low electrical current consumption mode is able to correspond to any operating mode of the device that may be able to, but is not definitely required to, exhibit low electrical current consumption. In some examples, a low electrical current consumption mode may not always have low current consumption, but typically corresponds to a mode in which low current consumption is able to occur. A low current consumption mode in this context may generally be regarded as a manner of operating in which an electrical current drawn by the circuits and components of the electronic device, including the electrical current being used to charge the power pack 310, is or may be lower than the electrical current that is able to be produced by a receiving coil 302 when the receiving coil 302 is in close proximity to, and therefore strongly coupled to, a transmission coil 342 generating a magnetic field.

If it is determined that the device is operating in a low electrical current consumption mode, the electrical current being drawn through the receiving coil 302 may be insufficient to reflect the magnitude of coupling between the transmission coil 342 and the receiving coil 302. By increasing the electrical current being drawn through the receiving coil 302, greater variations in electrical current being produced by the receiving coil 302 are able to be determined, and a greater range of magnetic field coupling magnitudes are able to be measured.

In one example, if the power pack charging controller 306 is operating to charge the power pack 310 in a constant current mode, it is assumed in one example that the power pack charging controller 306 provides a sufficient electrical load on the receiving coil 302 to draw enough current through the receiving coil 302 to support determining a sufficiently large variation in magnetic coupling between the transmission coil 342 and the receiving coil 302. In such an example, a determination that the power pack charging controller 306 is operating to charge the power pack 310 in a constant current mode is a determination that the device is not operating in a low electrical current consumption mode.

In a further example, such as a device where the receiving coil 302 is able to receive more energy than is used by the power pack charging controller 306 when it is operating to charge the power pack 310 in a constant current mode, a device is able to also determine that the device is operating in a low electrical current consumption mode even when the power pack charging controller 306 is operating to charge the power pack 310 in a constant current mode. A device that is able to determine that the device is operating in a low electrical current consumption mode even when the power pack charging controller 306 is operating to charge the power pack 310 in a constant current mode is able to determine that the device is not operating in a low electrical current consumption mode based upon, for example, an operating mode of other electrical components of the device.

If it is determined that the device is operating in a low electrical current consumption mode, the wireless energy transfer component positioning aid process 400 in one example increases, at 406, the electrical current drawn by the device. In effect, the device, or at least one component of the device, is placed into a high electrical current consumption mode. In other words, at least one component of the electronic device is placed into a high electrical current consumption mode in this example in order to increase the electrical current drawn by the electronic device. In one example, at least one component of the electronic device is configured into a high electrical current consumption mode based on the determination that the electronic device is operating in a low electrical current mode. In on example, the at least one component of the electronic device is configured into a high electrical current consumption mode when a determination is made that the electronic device is operating in a low electrical current mode. The electrical current drawn by the device is able to be increased by various techniques, some of which have been mentioned above. In one example, as described in regards to FIG. 3 above, a switchable load 312 is able to be placed into an electrically conductive state. Alternatively, or additionally, the circuits 308 are able to be placed into an operating mode that results in a higher level of electrical current being drawn by the circuits 308, thereby increasing the electrical current drawn by the electronic device 350 and drawn through the receiving coil 302. For example, activating the Radio Frequency Amplifier (RF Amp) 330, the device vibration motor 332 or any other motor, the display backlight, other components, or combinations of these, is an example of placing at least one component of the electronic device 350 into a high electrical current consumption mode.

If it is determined, at 404, that the device is not operating in a low electrical current consumption mode, or after increasing, at 406, the electrical current drawn by the device, the wireless energy transfer component positioning aid process 400 determines, at 408, a present received energy value that corresponds in one example to the amount of electrical current induced in a receiving coil of the device that is adapted to inductively couple to a transmission coil external to the electronic device 350. In one example, an amount of electrical current is determined based upon placing at least one component into a high electrical current consumption mode. The present received energy value in one example is an amount of electrical current induced in and produced by the receiving coil 302. The present received wireless energy value is, for example, able to be based upon an amount of electrical current provided by the power pack charging controller 306 to charge the power pack 310 or power other components. The present received wireless energy value is determined in one example by the electrical charging current meter 322.

Based on the determined present received energy value, the wireless energy transfer component positioning aid process 400 provides, at 410, an indication of the present received wireless energy value. The indication in one example corresponds to the amount of electrical current that is induced in the receiving coil 302. The provided indication is provided on an indicator in one example based on the determination of the amount of electrical current induced in the receiving coil 302, such as is described above. Providing the indication based on the determination of an amount of electrical current is able to include, for example, providing the indication after a measurement is made of the electrical current flowing through or induced in the receiving coil 302. In various examples, the provided indication is able to include varying an intensity or other observable quantity of one or more visual indicators, one or more audible indicators, one or more tactile indicators, one or more vibratory or other motion based indicator, any other indicator, or combinations of these. For example, an audible indicator is able to become louder or have different audible frequency contents based upon the present value of the charging current being produced by the power pack charging controller 306. Examples of visual indications are described in further detail below. The wireless energy transfer component positioning aid process 400 then returns to determine if a positioning aid is to be provided, at 402.

FIG. 5 illustrates a weak magnetic coupling status indication 500, according to one example. weak magnetic coupling status indication 500 may be presented to a user by way of an indicator such as a general purpose display screen or a dedicated LCD. Referring to FIG. 3, the weak magnetic coupling status indication 500 depicts an example of a visual or graphic indication provided to a user of the electronic device 350 on, for example, the display 316. The weak magnetic coupling status indication 500 is presented to a user to indicate there is relatively weak coupling of magnetic energy between the receiving coil 302 of the electronic device 350 and the transmission coil 342 of the charging station 340. By observing the status indication, and by observing whether the indication denotes a stronger or weaker inductive coupling as the location of the electronic device 350 changes, the user may position electronic device 350 in such a way as to improve or strengthen the inductive coupling. Colloquially speaking, a user may by trial and error realize a stronger inductive coupling by changing the position of the electronic device 350 and observing whether the weak magnetic coupling status indication 500 changes to a strong magnetic coupling status indication.

The weak magnetic coupling status indication 500 depicts a multiple segment bar that consists of five (5) segments. These five (5) segments in one example illuminate sequentially to indicate the relative strength of magnetic coupling between the receiving coil 302 of the electronic device 350 and the transmission coil 342 of the charging station 340. Under the weak coupling conditions depicted for the weak magnetic coupling status indication 500, the first two segments, i.e., a first segment of a weak indication 502, and a second segment of a weak indication 504 are shown as illuminated, while the remaining segments are distinguished from those first two segments by not being illuminated. In particular, a third segment of a weak indication 506, a fourth segment of a weak indication 508, and a fifth segment of a weak indication 510 are distinguished from the first two segments by not being illuminated. Particular segments are able to be distinguished by any suitable technique, such as coloring those segments a different color than the other segments, making those segments brighter, using another visual distinction, or combinations of these. As illustrated, the weak magnetic coupling status indication 500 represents a visual indication that corresponds to a reading of two-fifths of full scale.

The weak magnetic coupling status indication 500 indicates a condition with relatively weak magnetic coupling between the transmission coil 342 and the receiving coil 302. The relatively weak coupling is assumed in this example to be caused by the electronic device 350 being located relatively far from the transmission coil 342 of the charging station 340. A display of the weak magnetic coupling status indication 500 indicates to the user that the electronic device 350 should be moved in order to provide better magnetic coupling and thereby cause more magnetic energy to be received by the receiving coil 302 to generate more electrical current to provide to the power pack charging controller 306 to recharge the power pack 310.

The weak magnetic coupling status indication 500 includes a first legend 520 and a second legend 522. The first legend 520 is located near the left side of the status indication and reads "FAR." The second legend 522 is located near the right side of the status indication and reads "CLOSE." The first legend 520 provides a visual prompt to the user indicating that a status indication with highlighted bars only near the first legend 520 corresponds to the electronic device being "far" from its desired location. The second legend 522 provides a visual prompt to the user indicating that a status indication with highlighted that are also near the second legend 522 corresponds to the electronic device being "near" to a desired location that provides strong magnetic field coupling and correspondingly stronger electrical current to the circuits of the electronic device. In further examples, the first legend 520 is able to include any relevant indication, such as the word "WEAK," a graphical indication representing a small or low quantity, any suitable indication, or combinations of these. In further examples, the second legend 522 is also able to include any relevant indication, such as the word "STRONG," a graphical indication representing a large or full quantity, any suitable indication, or combinations of these.

FIG. 6 illustrates a strong magnetic coupling status indication 600, according to one example. Referring to FIG. 3, the strong magnetic coupling status indication 600 depicts an example of a visual indication provided to a user of the electronic device 350 and is displayed, for example, on the display 316. The strong magnetic coupling status indication 600 is displayed in a manner similar to the above described weak magnetic coupling status indication 500 but indicates that there is relatively strong coupling of magnetic energy between the receiving coil 302 of the electronic device 350 and the transmission coil 342 of the charging station 340.

The strong magnetic coupling status indication 600 depicts the multiple segment bar indication discussed above with regards to the weak magnetic coupling status indication 500. The five (5) segments are depicted as: a first segment of a strong indication 602, a second segment of a strong indication 604, a third segment of a strong indication 606, a fourth segment of a strong indication 608, and a fifth segment of a strong indication 610. These five segments correspond to the five segments of the weak magnetic coupling status indication 500 with different segments distinguished from one another to indicate a stronger magnetic field coupling condition. The strong magnetic coupling status indication 600 also includes the above described first legend 520 and second legend 522 to assist a user's interpretation of the indication as is discussed above.

In the illustrated strong magnetic coupling status indication 600, the first segment of a strong indication 602, the second segment of a strong indication 604, the third segment of a strong indication 606, and the fourth segment of a strong indication 608 are illustrated as being distinguished from the fifth segment of a strong indication 610. The first segment of a strong indication 602, the second segment of a strong indication 604, the third segment of a strong indication 606, and the fourth segment of a strong indication 608 are able to be distinguished in one or more manners as are discussed above for the weak magnetic coupling status indication 500. As illustrated, the strong magnetic coupling status indication 600 represents a visual indication that corresponds to a reading of four-fifths of full scale.

The strong magnetic coupling status indication 600 indicates a condition with relatively strong magnetic coupling between the transmission coil 342 and the receiving coil 302. The relatively strong coupling is assumed in this example to be caused by the electronic device 350 being located in close proximity to the transmission coil 342 of the charging station 340. A display of the strong magnetic coupling status indication 500 indicates to the user that the electronic device 350 is in a good position to wirelessly receive energy, particularly compared to a location in which the weak magnetic coupling status indication 500 is presented.

Figure 7:
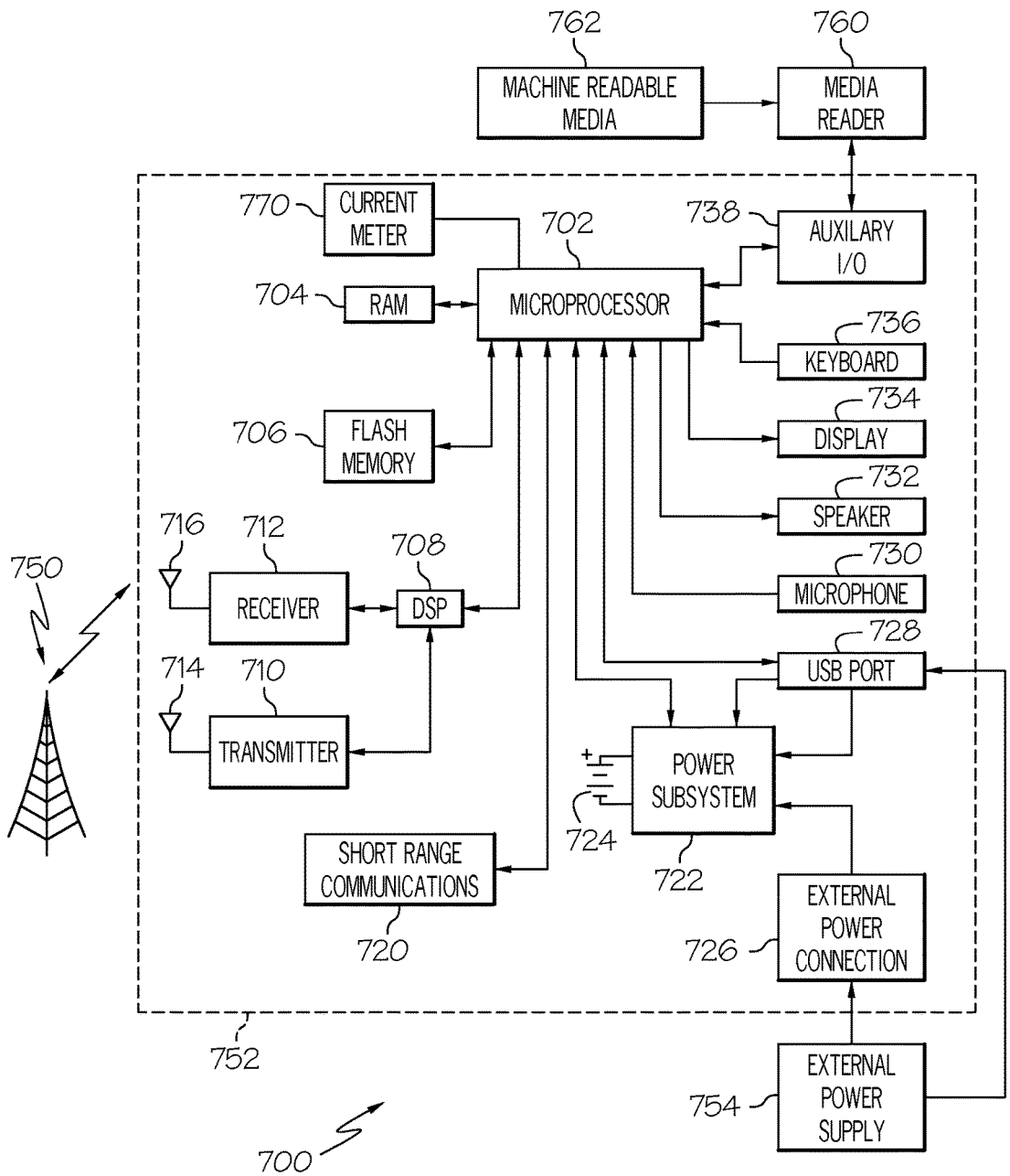
FIG. 7 is a block diagram of an electronic device and associated components in which the systems and methods disclosed herein may be implemented.

FIG. 7 is a block diagram of an electronic device and associated components 700 in which the systems and methods disclosed herein may be implemented. In this example, an electronic device 752 is also a wireless two-way communication device with voice and data communication capabilities. Such electronic devices communicate with a wireless voice or data network 750 using a suitable wireless communications protocol. Wireless voice communications are performed using either an analog or digital wireless communication channel. Data communications allow the electronic device 752 to communicate with other computer systems via the Internet. Examples of electronic devices that are able to incorporate the above described systems and methods include, for example, a data messaging device, a two-way pager, a cellular telephone with data messaging capabilities, a wireless Internet appliance or a data communication device that may or may not include telephony capabilities. The electronic device 350 described above is an example of the electronic device 752. Although there may be some mapping between electronic device 350 and electronic device 752—for example, display 316 may correspond to display 734—electronic device 752 will be described as an example of one wirelessly powered device that may employ the apparatus or methods disclosed herein.

The illustrated electronic device 752 is an example electronic device that includes two-way wireless communications functions. Such electronic devices incorporate communication subsystem elements such as a wireless transmitter 710, a wireless receiver 712, and associated components such as one or more antenna elements 714 and 716. A digital signal processor (DSP) 708 performs processing to extract data from received wireless signals and to generate signals to be transmitted. The particular design of the communication subsystem is dependent upon the communication network and associated wireless communications protocols with which the device is intended to operate.

The electronic device 752 includes a microprocessor 702 that controls the overall operation of the electronic device 752. The microprocessor 702 interacts with the above described communications subsystem elements and also interacts with other device subsystems such as flash memory 706, random access memory (RAM) 704, auxiliary input/output (I/O) device 738, data port 728, display 734, keyboard 736, speaker 732, microphone 730, a short-range communications subsystem 720, a power subsystem 722, a current meter 770, other subsystems, or combinations of these.

One or more power storage or supply elements, such as a battery 724, are connected to a power subsystem 722 to provide power to the circuits of the electronic device 752. The power subsystem 722 includes power distribution circuitry for providing power to the electronic device 752 and also contains battery charging circuitry to manage recharging the battery 724 (or circuitry to replenish power to another power storage element). The power subsystem 722 receives electrical power from external power supply 754. The power subsystem 722 is able to be connected to the external power supply 754 through a dedicated external power connector (not shown) or through power connections within the data port 728. The power subsystem 722 includes a battery monitoring circuit, such as the above described battery monitor 318, that is operable to provide a status of one or more battery status indicators, such as remaining capacity, temperature, voltage, electrical current consumption, and the like, to various components of the electronic device 752. The current meter 770 operates in a manner similar to the charging electrical current meter 322 discussed above.

Data communication through data port 728 enables a user to set preferences through the external device or through a software application and extends the capabilities of the device by enabling information or software exchange through direct connections between the electronic device 752 and external data sources rather than via a wireless data communication network. In addition to data communication, the data port 728 provides power to the power subsystem 722 to charge the battery 724 or to supply power to the electronic circuits, such as microprocessor 702, of the electronic device 752.

Operating system software used by the microprocessor 702 is stored in flash memory 706. Further examples are able to use a battery backed-up RAM or other non-volatile storage data elements to store operating systems, other executable programs, or both. The operating system software, device application software, or parts thereof, are able to be temporarily loaded into volatile data storage such as RAM 704. Data received via wireless communication signals or through wired communications are also able to be stored to RAM 704.

The microprocessor 702, in addition to its operating system functions, is able to execute software applications on the electronic device 752. A set of applications that control basic device operations, including at least data and voice communication applications, is able to be installed on the electronic device 752 during manufacture. Examples of applications that are able to be loaded onto the device may be a personal information manager (PIM) application having the ability to organize and manage data items relating to the device user, such as, but not limited to, e-mail, calendar events, voice mails, appointments, and task items. The microprocessor 702 is further able to perform part or all of the above described processing.

Further applications may also be loaded onto the electronic device 752 through, for example, the wireless network 750, an auxiliary I/O device 738, Data port 728, short-range communications subsystem 720, or any combination of these interfaces. Such applications are then able to be installed by a user in the RAM 704 or a non-volatile store for execution by the microprocessor 702.

In a data communication mode, a received signal such as a text message or web page download is processed by the communication subsystem, including wireless receiver 712 and wireless transmitter 710, and communicated data is provided the microprocessor 702, which is able to further process the received data for output to the display 734, or alternatively, to an auxiliary I/O device 738 or the Data port 728. A user of the electronic device 752 may also compose data items, such as e-mail messages, using the keyboard 736, which is able to include a complete alphanumeric keyboard or a telephone-type keypad, in conjunction with the display 734 and possibly an auxiliary I/O device 738. Such composed items are then able to be transmitted over a communication network through the communication subsystem.

For voice communications, overall operation of the electronic device 752 is substantially similar, except that received signals are generally provided to a speaker 732 and signals for transmission are generally produced by a microphone 730. Alternative voice or audio I/O subsystems, such as a voice message recording subsystem, may also be implemented on the electronic device 752. Although voice or audio signal output is generally accomplished primarily through the speaker 732, the display 734 may also be used to provide an indication of the identity of a calling party, the duration of a voice call, or other voice call related information, for example.

Depending on conditions or statuses of the electronic device 752, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 720 in one example is a short range wireless data communications component that provides data communication between the electronic device 752 and different systems or devices, which need not necessarily be similar devices. For example, the short-range communications subsystem 720 includes an infrared device and associated circuits and components or a Radio Frequency based communication module such as one supporting Bluetooth® communications, to provide for communication with similarly-enabled systems and devices, including the data file transfer communications described above.

A media reader 760 is able to be connected to an auxiliary I/O device 738 to allow, for example, loading computer readable program code of a computer program product into the electronic device 752 for storage into flash memory 706. One example of a media reader 760 is an optical drive such as a CD/DVD drive, which may be used to store data to and read data from a computer readable medium or storage product such as computer readable storage media 762. Examples of suitable computer readable storage media include optical storage media such as a CD or DVD, magnetic media, or any other suitable data storage device. Media reader 760 is alternatively able to be connected to the electronic device through the Data port 728 or computer readable program code is alternatively able to be provided to the electronic device 752 through the wireless network 750.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

One or more embodiments may realize one or more benefits, some of which (such as improved efficiency) have been mentioned already. One or more embodiments may be adapted for use with a number of wirelessly powered devices. Some embodiments may be implemented in relatively small space, making them useful for wirelessly powering handheld devices or transferring power to wirelessly powered devices on the limited space of a table or desk. The techniques enable a user, quickly and conveniently, and perhaps intuitively, to use the feedback of the indications to improve the powering or charging of the user's device. By observing the indicators, a user can improve the strength of the inductive coupling, and may thereby achieve one or more desirable results, such as reducing the time for inductive charging of the device.

What is claimed is:

1. A wirelessly powered device, comprising:
a device positioning aid processor configured to:
place at least one component into a high electrical current consumption mode; and
receive, based on placing the at least one component into a high electrical current consumption mode, a measured value from an electrical current measurement device, the measured value indicating an amount of an electrical current induced in a receiving coil adapted to inductively couple to a transmission coil external to the wirelessly powered device, where at least part of the electrical current induced in the receiving coil is provided to the at least one component; and
a charging device proximity indicator, communicatively coupled to the device positioning aid processor, the charging device proximity indicator configured to provide, based on the measured value indicating the amount of electrical current, an indication corresponding to an amount of distance from the receiving coil to the transmission coil based on the amount of electrical current.

2. The wirelessly powered device of claim 1, wherein the device positioning aid processor is further configured to determine that a device is operating in a low electrical current consumption mode, and
the device positioning aid processor is further configured to place at least one component into a high electrical current consumption mode based on the determination that the device is operating in a low electrical current consumption mode.

3. The wirelessly powered device of claim 2, wherein the device positioning aid processor is configured to determine that a device is operating in a low electrical current consumption mode by determining that a power pack of the device is being charged in a constant voltage charging mode.

4. The wirelessly powered device of claim 1, wherein the device positioning aid processor is configured to place at least one component into a high electrical current consumption mode by at least increasing a processing clock speed of a digital processor.

5. The wirelessly powered device of claim 4, wherein increasing the processing clock speed of the digital processor comprises configuring the processing clock speed to a maximum processing clock speed of the digital processor.

6. The wirelessly powered device of claim 1, wherein the device positioning aid processor is configured to place at least one component into a high electrical current consumption mode by at least increasing an intensity level of light emitted by a variable intensity display backlight.

7. The wirelessly powered device of claim 6, wherein the device positioning aid processor is configured to increase the intensity level of light emitted by the variable intensity display backlight by increasing the intensity level of light emitted by the variable intensity display backlight to a full intensity level.

8. The wirelessly powered device of claim 1, wherein the device positioning aid processor is configured to place at least one component into a high electrical current consumption mode by at least activating an RF amplifier.

9. The wirelessly powered device of claim 1, wherein the device positioning aid processor is configured to place at least one component into a high electrical current consumption mode by at least activating a motor.

10. A method, comprising:
placing at least one component of a wirelessly powered device into a high electrical current consumption mode; and
receiving, based on placing the at least one component into a high electrical current consumption mode, a measured value from an electrical current measurement device, the measured value indicating an amount of an electrical current induced in a receiving coil adapted to inductively couple to a transmission coil external to the wirelessly powered device, where at least part of the electrical current induced in the receiving coil is provided to the at least one component; and
providing, based on the measured value indicating the amount of electrical current, an indication corresponding to an amount of distance from the receiving coil to the transmission coil based on the amount of electrical current.

11. The method of claim 10, further comprising:
determining that a device is operating in a low electrical current consumption mode; and
wherein the placing the at least one component into a high current consumption mode is based on the determination that the device operating in a low electrical current consumption mode.

12. The method of claim 11, wherein the determining that the device is operating in a low electrical current consumption mode comprises determining that a power pack of the device is being charged in a constant voltage charging mode.

13. The method of claim 10, wherein the placing at least one component into a high electrical current consumption mode comprises increasing a processing clock speed of a digital processor.

14. The method of claim 10, wherein the placing at least one component into a high electrical current consumption mode comprises increasing an intensity level of light emitted by a variable intensity display backlight.

15. The method of claim 10, wherein the placing at least one component into a high electrical current consumption mode comprises activating a motor.

16. The method of claim 10, wherein the placing at least one component into a high electrical current consumption mode comprises activating an RF amplifier.

17. A computer readable storage medium having computer readable program code embodied therewith, the computer readable program code comprising instructions for:
placing at least one component of a wirelessly powered device into a high electrical current consumption mode; and
receiving, based on placing the at least one component into a high electrical current consumption mode, a measured value from an electrical current measurement device, the measured value indicating an amount of an electrical current induced in a receiving coil adapted to inductively couple to a transmission coil external to the wirelessly powered device, where at least part of the electrical current included in the receiving coil is provided to the at least one component; and
providing, based on the measured value indicating the amount of electrical current, an indication corresponding to an amount of distance from the receiving coil to the transmission coil based on the amount of electrical current.

18. The computer readable storage medium of claim 17, the computer readable program code further comprising instructions for:
determining that a device is operating in a low electrical current consumption mode; and
wherein the placing at least one component into a high electrical current consumption mode is based on the determination that the device operating in a low electrical current consumption mode.

19. The wirelessly powered device of claim 1, wherein the device positioning aid processor receives the measurement from a battery monitor monitoring charging electrical current delivered to a battery of the wirelessly powered device.

20. The wirelessly powered device of claim 1, wherein the charging device proximity indicator comprises a visual status indicator configured to depict, to a user of the wirelessly powered device, the indication corresponding to the amount of distance from the receiving coil to the transmission coil based on the amount of the electrical current.

* * * * *